(12) United States Patent
Bentitou et al.

(10) Patent No.: US 9,736,309 B1
(45) Date of Patent: Aug. 15, 2017

(54) REAL-TIME TRANSCRIPTION AND INTERACTION WITH A CALLER BASED ON THE TRANSCRIPTION

(71) Applicant: CIRCLE RIVER, INC., New York, NY (US)

(72) Inventors: Adam Bentitou, New York, NY (US); David Mansfield, New York, NY (US); Robert Lippman, East Hampton, NY (US)

(73) Assignee: Circle River, Inc., New York, NY (US)

( * ) Notice: Subject to any disclaimer, the term of this patent is extended or adjusted under 35 U.S.C. 154(b) by 0 days.

(21) Appl. No.: 15/241,555

(22) Filed: Aug. 19, 2016

(51) Int. Cl.
| | |
|---|---|
| *H04M 1/64* | (2006.01) |
| *H04M 3/527* | (2006.01) |
| *G10L 15/26* | (2006.01) |
| *G10L 13/08* | (2013.01) |
| *G10L 15/30* | (2013.01) |

(52) U.S. Cl.
CPC .............. *H04M 3/527* (2013.01); *G10L 13/08* (2013.01); *G10L 15/26* (2013.01); *G10L 15/30* (2013.01); *H04M 2201/39* (2013.01); *H04M 2201/40* (2013.01); *H04M 2201/60* (2013.01)

(58) Field of Classification Search
CPC .............. H04M 3/537; H04M 2201/40; H04M 3/53333; G10L 15/22; G10L 15/26
USPC .................................... 379/88.13–88.14
See application file for complete search history.

(56) References Cited

U.S. PATENT DOCUMENTS

| | | | |
|---|---|---|---|
| 6,208,726 B1 | 3/2001 | Bansal et al. | |
| 8,045,689 B2 | 10/2011 | Provenzale et al. | |
| 8,774,369 B2 * | 7/2014 | Xing ...................... | H04M 3/436 379/208.01 |
| 8,917,823 B1 | 12/2014 | Sacks et al. | |
| 2008/0059177 A1 | 3/2008 | Poirier et al. | |
| 2009/0104898 A1 * | 4/2009 | Harris .................... | H04M 1/663 455/415 |
| 2015/0103983 A1 * | 4/2015 | Kilmer ................. | H04M 3/4365 379/88.01 |

* cited by examiner

*Primary Examiner* — Van D Huynh
(74) *Attorney, Agent, or Firm* — Winston & Strawn LLP

(57) ABSTRACT

Receiving a telephone call to an auto-attendant, artificial intelligence, or person takes place. While this phone call is being conducted, a speech to text transcription is created and sent in real-time to another person at another network node. This person can read the transcript and interact with the phone call by sending his or her own commands, text, or speech to be made part of the phone call.

19 Claims, 5 Drawing Sheets

REAL-TIME TRANSCRIPTION AND INTERACTION WITH A CALLER BASED ON THE TRANSCRIPTION

FIELD OF THE DISCLOSED TECHNOLOGY

The disclosed technology relates generally to automated call answering and, more specifically, real-time transcription and communication via receipt of the transcription.

BACKGROUND OF THE DISCLOSED TECHNOLOGY

Sometimes a person wants to receive all of his or her calls. Sometimes he/she only wants to receive some of them. Some people have secretaries to screen calls. Others realize only after taking the call that they didn't want accept it. Methods are needed to help called parties decide whether to take an incoming call or not.

SUMMARY OF THE DISCLOSED TECHNOLOGY

A method of receiving a telephone call is carried out by way of receiving a phone call at a first network node. Then, by use of speech recognition, a transcription of an audio of the telephone call is created. This can include audio from both sides of the conversation (the calling party and the party who answered the call, who, in embodiments of the disclosed technology is an artificial intelligence) or just the calling party, as the transcript of the audio played over the phone call by the called party is already known. In either case, while creating the transcription of an audio of the telephone call, the transcription is sent to a bidirectional transceiver at a second network node, in real-time.

For purposes of this disclosure, "artificial intelligence" is defined as a combination of a tangible storage device and processor carrying out instructions to receive audio or text and provide a response related to the audio or text. Further, for purposes of this disclosure, a "bidirectional transceiver" is a device which can send/transmit and receive data via wired or wireless communication, using a circuit-switched or packet-switched method of data communication. Further, "real-time" is defined as, during the conversation, without any intentional delay, and substantially as fast as the devices and communication methods used can physically process and send the data. In embodiments, "real-time" is less than five seconds, three seconds, or one second from completing transcription of a block of text, until the text is exhibited on a bi-directional transceiver. A "network node" is defined as a physical location on a network where a signal is received and interpreted or rebroadcast.

While the conversation between the calling party and the artificial intelligence is taking place through a series of audio between the parties and transcription thereof, the bidirectional transceiver at another network node can interact with the call, acting on the part of, or effecting the called party/artificial intelligence. This can be in the form of receiving instructions from the bidirectional transceiver to send the telephone call to the second network node, whereby the call is sent and is now forwarded to, and answered at, the bidirectional transceiver. This can happen before, during or after carrying on the conversation with the calling party via converting text to speech, or by playing pre-recorded audio clips, or some combination thereof.

While or after the call is going on, and the bi-directional transceiver is receiving a real-time transcript, the audio of the call can be outputted to the bi-directional transceiver based on a request received there-from. Or, the call can be transferred in its entirety to the bi-directional transceiver. The transcription may continue or may cease at this time, and the call, in some embodiments, can be sent entirely back to the artificial intelligence at the second network node to continue the call. Still further, the bi-directional transceiver may send instructions to forward the call to a third network node, such as one associated with, or which will be answered by, an entirely different person or entity. For example, on a technical support call, the second network node might be monitoring a plethora of call transcripts and realize a certain call needs to be elevated to someone with more experience/a human being, and so such instructions will be sent, the calling party will be notified by the artificial intelligence, and the call will be transferred. The audio can remain/be sent to the second network node for monitoring while the call is actually handled by the third network node.

The bi-directional transceiver can also modify the output of the audio in the call by way of receiving speech, text, or on-screen selection at the bi-directional transceiver, which is interpreted, and/or transmitted, in audio form into the phone call to the calling party. This can be included, for example, using the speech recognition to determine that the calling party wants to schedule a meeting and, using instructions received (via audio input, text input, or an on-screen selection) from the bidirectional transceiver include a date and time for the meeting to suggest and/or schedule the meeting. Such a meeting can be via phone, video conference, or in person. Thus, if applicable, a place of meeting can also be confirmed using this method of communication. This can be as a result of determining that a called party is unavailable (based on the afore-described methods of entry, which in this case, can take place before the phone call or during).

Audio received into the bi-directional transceiver can be played directly into the call in embodiments. In other embodiments, the audio played in the call is as a result of speech recognition of audio from the bi-directional transceiver, which is then subject to text to speech synthesis, such that the same voice of the artificial intelligence is used for the speech received from the live person at the second network node/bi-directional transceiver.

Other commands which can be received from the bi-directional transceiver, using the above-described input and transmission methods, include disconnecting the call, forwarding the call to a third party, and forwarding the call to the second network node/bi-directional transceiver based on detecting an urgent condition as part of an automatic process of detecting a particular keyword, or the like indicating urgency.

A telephone switch having at least one telephone network node, and at least one network connection with a bidirectional transceiver, is also part of the disclosed technology. It receives calls, has a speech recognition engine, a transcription engine and telephone, as well as other wired and/or wireless network connections, including such as for internet protocol networks.

In further embodiments of the disclosed technology, artificial intelligence is used when receiving a telephone call in the following manner. The call is received to a first network node and, based on speech recognition of audio received from the calling party, a transcription of such audio is created. Audio output, which is, at least in part, formed as a response to the calling party as part of a conversation (defined as, "what a person of ordinary skill in the art would recognize as give and take between two parties such that each party gains at least some previously unknown information from the other party") is transmitted into the phone call. This audio output is created by at least one of text to speech synthesis or playing pre-recorded audio appropriate for having the conversation. While creating the transcription of at least some of the audio of the telephone call (at the same moment in time and/or in real-time), the transcription is sent to a bi-directional transceiver at a second network node.

The audio output played into the phone call at the called party end (receiving or second network node) can be partially based on artificial intelligence and partially on instructions received from the bidirectional transceiver which is receiving the transcription. The latter can be effectuated by sending data to the bidirectional transceiver sufficient to cause a plurality of selectable elements to be exhibited on the bi-directional transceiver. These selectable elements (e.g., buttons displayed or exhibited on a screen) can be based on preceding conversation between the calling party and the artificial intelligence. Such selectable elements (and actions carried out/resulting corresponding audio in the conversation) can include one, or a plurality of: a) causing the call to be forwarded to another network node or called party, b) causing future calls determined to be from the same calling party (such as by comparing caller identification, voice recognition, or other data) received at the first network node to be forwarded to the bidirectional transceiver, bypassing the step of said creating said transcription, c) causing future calls from the calling party to converse with the artificial intelligence without any transcription/notification to the bi-directional transceiver, d) schedule a meeting (via the artificial intelligence).

The disclosed technology further concerns when to forward a phone call to a called party. When the called party indicates that he/she is available, the call is sent to the called party in more instances than when the called party indicates that he/she is unavailable. In fact, being "unavailable," for purposes of this disclosure, is defined as indicating a desire to, and/or sending instructions to, accept fewer phone calls than in an "available" state. The fewer phone calls accepted are based upon one or more parameters, such as only accepting urgent calls. Urgent calls or call urgency is determined based on factors described herein below. It should also be understood that "phone call" can refer to phone calls over a public-switched telephone network, a private telephone network, and/or any method of sending/receiving audio between two devices. For purposes of this disclosure, "phone" is used to refer to all such instances.

In embodiments of the disclosed technology, a phone call is sent to a device associated with the called party, which is defined as a caller attempting to reach a particular person or entity associated by way of a direct inward dial number (DID), associated alias or user identification, or the like. The called party uses a bidirectional transceiver (a device which receives and sends electrical impulses whether wired or wireless), which is referred to together as the "called party," meaning the person who controls, or is associated with, the device and/or DID, or the like. The call directed to the called party is received at a network node, where the calling party is determined based on one or both of call identification information or voice recognition. The call identification information can be provided as digital information out of band with the audio of the phone call (for example, the calling line identification or CallerID protocol, as well as the automatic number identification (ANI) protocol). Or the call identification information can be provided by the calling party during the phone call, such as being prompted for, and responding with, a name. Voice recognition can be used in conjunction there-with to match the calling party to previous calling parties.

Any device or step to a method described in this disclosure can comprise, or consist of, that which it is a part of, or the parts which make up the device or step. The term "and/or" is inclusive of the items which it joins linguistically and each item by itself. The term "substantially" can be used to modify any other term in this disclosure and defined as "at least 90% of" or "within half a second of" the term being modified.

DETAILED DESCRIPTION OF EMBODIMENTS OF THE DISCLOSED TECHNOLOGY

Receiving a telephone call to an auto-attendant, artificial intelligence, or person takes place. While this phone call is being conducted, a speech to text transcription is created and sent in real-time to another person at another network node. This person can read the transcript and interact with the phone call by sending his or her own commands, text, or speech to be made part of the phone call.

For purposes of this disclosure, "speech recognition" is defined as "making a determination of words exhibited aurally." Further, "voice recognition" is defined as "making a determination as to who is the speaker of words."

Embodiments of the disclosed technology are described below, with reference to the figures provided.

Figure 1:
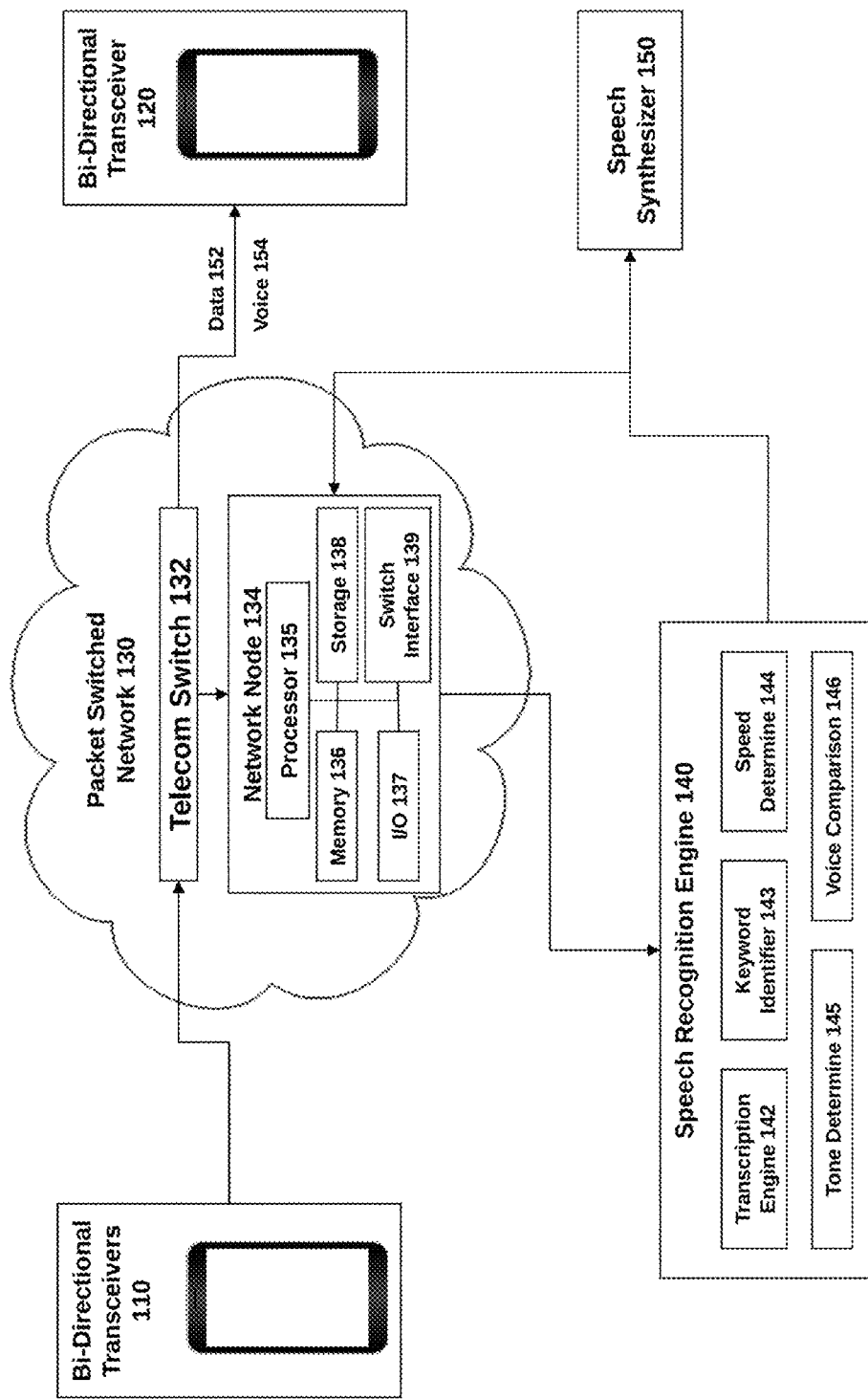
FIG. 1 is a high level block diagram of devices which are used to carry out embodiments of the disclosed technology.

FIG. 1 is a high level block diagram of devices which are used to carry out embodiments of the disclosed technology. A bi-directional transceiver 110 associated with a calling party is shown. Typically, a call is placed from one calling party 110, with an intent to reach an entity associated with a receiving device, such as a bi-directional transceiver 120, which is the called party. This call can be over a regular phone line or phone network and have aspects or parts of the call which are wired or wireless. The called party can be a particular person operating the device 120 or any one of a group of people, such as an employee of a company being called by a calling party 110. In some embodiments of the disclosed technology, the called party is any live human being who is conversing via the telecommunications switch 132, and the network node 134 is any non-live person or synthesized speech from text (e.g., "artificial intelligence") doing likewise. One or more of the bi-directional transceivers can have some or all of the following elements: a GPS (Global Positioning System) receiver, an accelerometer, input/output mechanisms, and a transmitter.

Calling party identification mechanisms used to determine who the calling party is, include location determination mechanisms based on location reported by the GPS, the Internet protocol (IP address) of one of the bi-directional transceivers 110 and/or 120, and looking up a location associated with a number reported by the calling line identification (caller ID) or ANI (automated number identification) protocols.

Input/output mechanisms of the bi-directional transceivers can include a keyboard, touch screen, display, and the like, used to receive input from, and send output to, a user of the device. A transmitter enables wireless transmission and receipt of data via a packet-switched network, such as packet-switched network 130. This network, in embodiments, interfaces with a telecommunications switch 132 which routes phone calls and data between two of the bi-directional transceivers 110 and 120. Versions of these data, which include portions thereof, can be transmitted between the devices. A "version" of data is that which has some of the identifying or salient information, as understood by a device receiving the information. For example, audio converted into packetized data can be compressed, uncompressed, and compressed again, forming another version. Such versions of data are within the scope of the claimed technology, when audio or other aspects are mentioned.

Referring again to the telecom switch 132, a device and node where data are received and transmitted to another device via electronic or wireless transmission, it is connected to a network node 134, such as operated by an entity controlling the methods of use of the technology disclosed herein. This network node is a distinct device on the telephone network, which sends and receives data to the telephone network, or another network which carries audio or versions of data used for creating, or were created from, audio. At the network node is a processor 135 deciding when the bi-directional transceivers 110 and 120 can communicate with each other via audio, such as by forwarding the call from a transceiver 110 to a transceiver 120. At the network node 134 there is also memory 136 (volatile or non-volatile) for temporary storage of data, storage 138 for permanent storage of data, and input/output 137 (like the input/output 124), and an interface 139 for connecting via electrical connection to other devices.

Still discussing FIG. 1, a voice or speech recognition engine 140 is used. This is a device which receives audio input, detects speech and can do any one or a multiple of things with speech, such as transcribing the speech into text with a transcription engine 142, identifying keywords in the text with a keyword identifier 143, determining the speed of the speech (144) over the course of the audio, determining the tone of the audio (145), and determining whose voice the audio belongs to by comparing the voice to previous calls (146). In this manner, aspects of the audio and, therefore, aspects of the call, are determined. Based on this, a speech synthesizer 150 is used, in embodiments of the disclosed technology, to communicate back over an audio channel (such as on a phone call) with the caller. In other embodiments, recorded voices can be used instead of, or in conjunction with, the synthesized speech.

Figure 2:
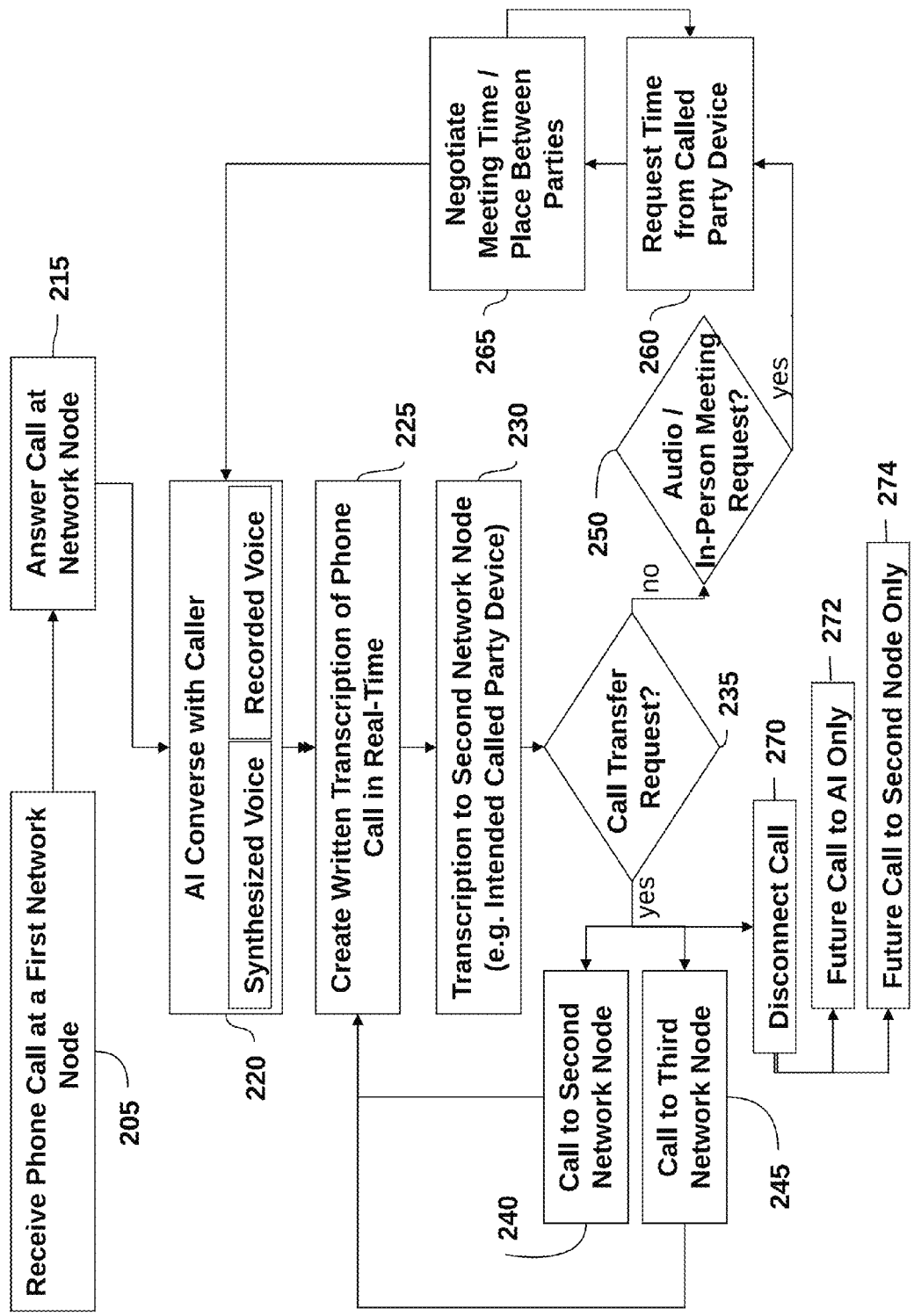
FIG. 2 is a high level flow chart depicting how calls are answered, transcribed, and manipulated, in embodiments of the disclosed technology.

FIG. 2 is a high level flow chart depicting how calls are answered, transcribed, and manipulated, in embodiments of the disclosed technology. In step 205, a phone call is received at a network node designated for a called party or intended/actual recipient person or entity for the call. The definitions and descriptions of who the called party can be are described with reference to FIG. 1. The call is answered in step 215 and an AI (artificial intelligence) begins to converse with the caller in step 220, using either a synthesized voice (text to speech) or recorded voice, as appropriate or designated ahead of time. A called party may elect to have all calls answered by an artificial intelligence system, indicate a time of day and/week when calls are answered by the AI, or only have this happen when the called party is unavailable. In order to do this, a plethora of factors can be taken into account. Before or after answering the call, callerID or ANI data is checked. This may, in step 220, help to determine the location of the calling party, which can be a factor in forwarding the call. For example, international calls can be sent to the called party even when he/she is "unavailable". Or the data can match a person on a "whitelist" and thus be forwarded to the called party. A calling party can be whitelisted, as will be described in step 274. In some embodiments, an indication is made to the calling party, during step 220, that the called party is unavailable. In other embodiments, the calling party does not receive an indication as such, but in any case, the method proceeds with step 220, where a synthesized or recorded voice is used to converse with the calling party.

While the call is taking place between the called party and the AI in step 220, a written transcription of the call is created in real-time in step 225, based on the text (converted to speech), text transcribed of the recorded voice, and/or the voice of the calling party converted to text. This transcription, again, in real-time or at the same moment in time that another part of the conversation is being transcribed, is sent to a second network node, such as bi-directional transceiver 120. Thus, the calling party (such as party 110) and the AI are having a conversation with audio back and forth, speech to text, and text to speech, while the called party and/or second network node and/or bi-directional transceiver 120 is receiving a written transcribed version of part or all of the audio between the calling party and AI.

A sample transcription of the audio in the phone call between the AI and the calling party might look something like this, by way of example:

Synthesized voice: "I'm sorry, but Mr. Lippman is unavailable. Is this an urgent matter?"

Calling Party: "Yes, it is!"

Synthesized voice: "Please tell me why it's urgent."

Calling Party: "I can't find the cat food, and the cat needs to eat!"

Synthesized voice: "Who is this, by the way?"

Calling Party: "It's Mr. Lippman's son."

Synthesized voice: "Okay, let me see if Mr. Lippman wants to answer the call."

The calling party and urgency of the call can be determined automatically based on the text transcription of the conversation. For example, Mr. Lippman's son might be determined as being the caller based on voice recognition (comparing the voice to previous calls with "son"), his location (comparing to prior locations when the son called and/or limiting the location when it is believed to be the son to calls from a certain area code or area codes that Mr. Lippman has previously designated as where his "family" might be calling from), or the like. In this case, urgency might also be detected based on certain keywords such as "son" or "cat." Mr. Lippman might want all calls from his son to be detected as urgent, so that the call might be detected as "urgent" as soon as the calling party says "Yes, it is!" or makes another recognizable utterance determined to be from a specific calling party. Or, in another embodiment, a negative keyword such as "cat" may be used. Thus, if someone says "cat," the call will be considered non-urgent because Mr. Lippman doesn't want to be interrupted to talk about the cat when he is unavailable. In any of the above cases, once urgency is detected, the call can be sent to the called party in step 240, such as to a device associated with the called party or under the direct operative control of the called party, such that, the called party can exchange audio with the calling party in the phone call.

In other embodiments, the called party and/or second network node and/or bi-directional transceiver 120 sends data, which are received by a device carrying out parts of the disclosed technology such as a telephone switch (which can comprise a single physical device or many such devices interacting directly or indirectly with the telephone network effecting audio in the telephone network itself). These data can include, as in step 235, a request to transfer the call to another party. That is, the call can be transferred to the second network node in step 240, or a third network node in step 245. The "third network node" can be, in embodiments of the disclosed technology, a third party previously unconnected to the audio or transcript of the call taking place. This can be a form of call forwarding which involves forwarding the call itself to another telephone network node and/or forwarding the real-time or live transcription to another.

Figure 4:
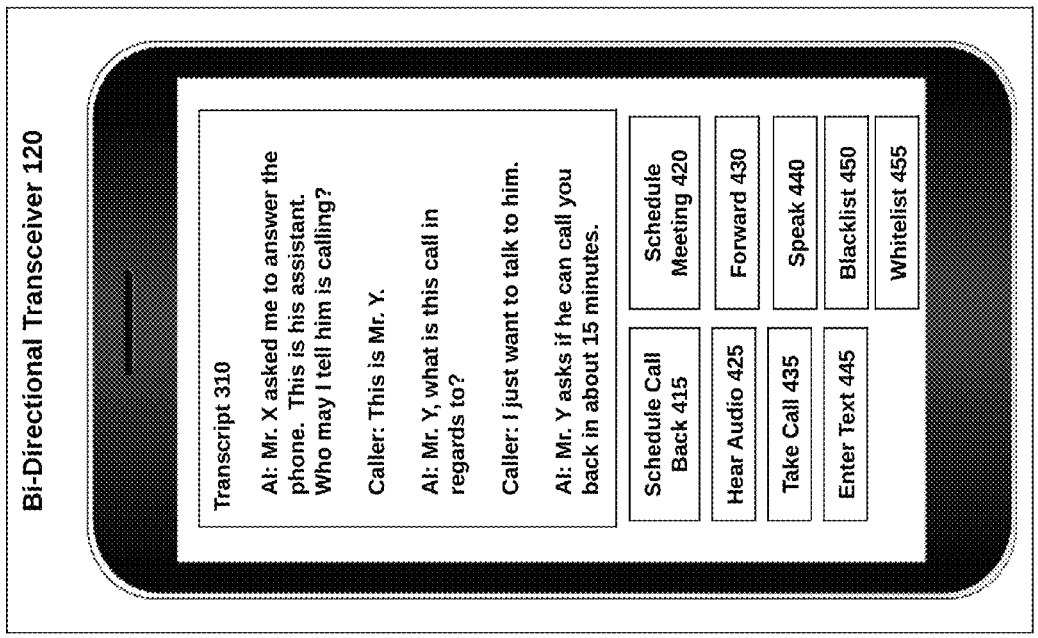
FIG. 4 depicts a bi-directional transceiver of a second party with real-time transcription and selectable elements used to interact with a calling party, in embodiments of the disclosed technology.

Or, in step 270, the bi-directional transceiver 120 can send instructions for the call to be disconnected. This can take place instead of, or after, steps 240 and/or 245. This can be indicated by hanging up the phone or selecting a button exhibited on the phone to disconnect the call. Further, once the call is disconnected, or as a function of selecting to disconnect the call (via voice instruction or text instruction which is recognized as such, or selecting a button, such as shown in FIG. 4 on a bi-directional transceiver), then future calls recognized as coming from the particular calling party can be send to the AI only in step 272 (bypassing steps of providing the transcription to the bi-directional transceiver in real-time), or directly to the bi-directional transceiver in step 274 (bypassing steps of providing an AI conversation with the caller after determining that the calling party has been whitelisted). Thus, in the case of a blacklist or whitelist (such as by carrying out steps 272 and 274, respectively) then future calls received in step 205 are handled accordingly. Whitelisted calls skip at least step 220 and can skip one or more additional steps described herein. Blacklisted calls skip step 230 and can skip one or more additional steps described herein. Until a call is determined to be from a calling party who is whitelisted, all the steps (e.g., step 230) can be carried out, and the transfer to the second network node in step 240 is carried out upon determining that it is a whitelisted caller. A whitelisted caller might have a password to pronounce or enter (via DTMF tones).

If no call transfer request is made in step 235, then step 250 can be carried out. Otherwise, the AI can continue to converse with the caller while steps 220, 225, and 230 are carried out cyclically and/or simultaneously until the calling party or AI decides to end the call and disconnect the phone call. Though, if step 250 is answered in the affirmative and meeting time is requested, then steps 260 and 265 are carried out cyclically, where in step 260, a requested time is presented to the called party, and in step 265 a meeting time and place is negotiated. The meeting time and place can be arranged entirely by the calling party and artificial intelligence, and in some embodiments, also with the input, during the call, into the bidirectional transceiver receiving the transcription. This meeting time and place can be a physical meeting place, or simply a time when the calling party and an intended recipient or other human being, such as an operator of the bidirectional transceiver (120) at the second network node, can converse via voice. Such a negotiated time for a further phone call might create a temporary whitelist for the calling party at the time of the future call, or provide a password/passcode for the calling party to present for the subsequent call to reach the bidirectional transceiver by way of carrying out step 240. After negotiating the time and place, the call can continue between the calling party and AI (steps 220, 225, and, in some cases, step 230).

Figure 3:
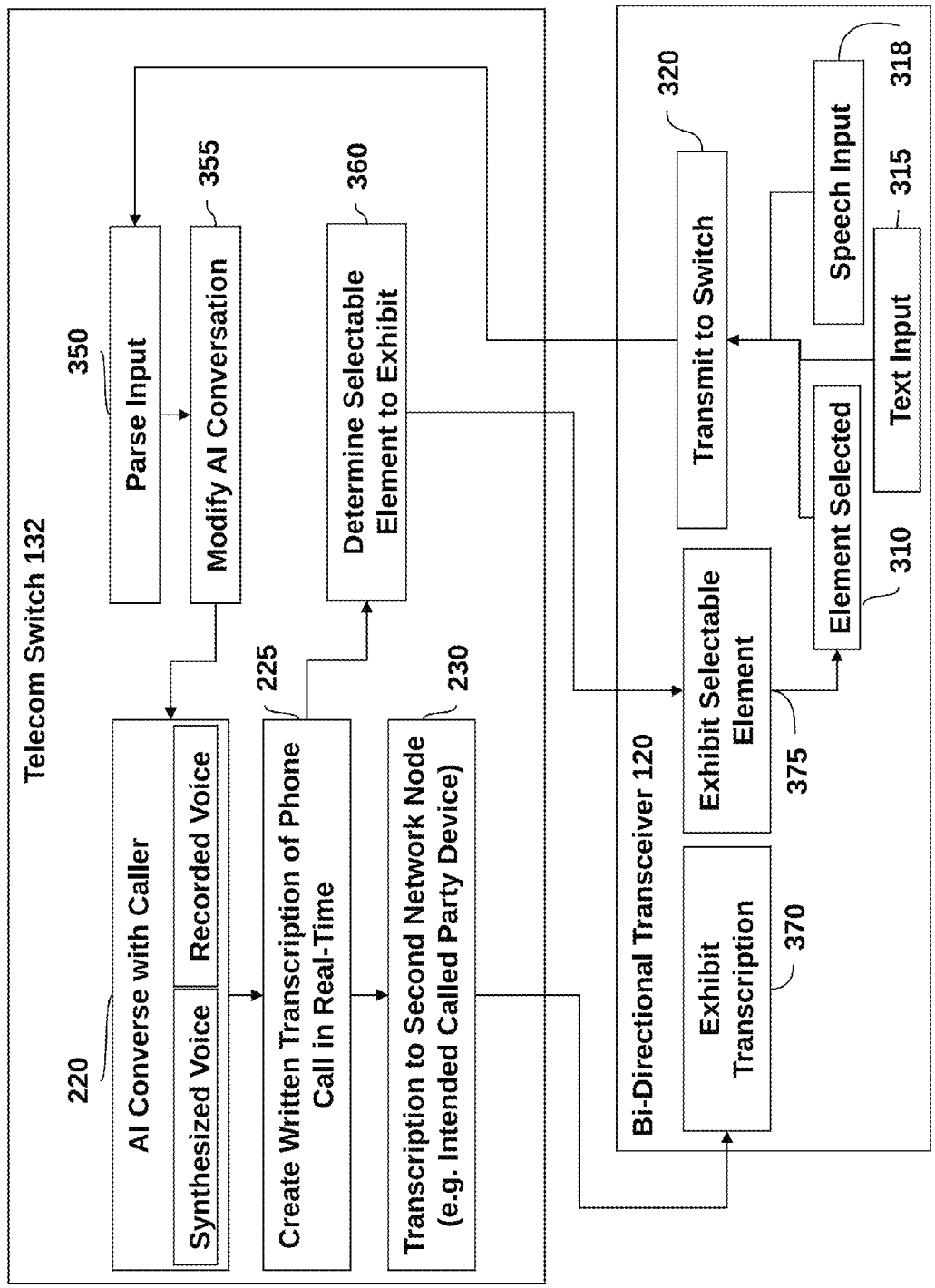
FIG. 3 is a high level flow chart of interactions between a telecommunications switch and a bi-directional transceiver, in embodiments of the disclosed technology.

FIG. 3 is a high level flow chart of interactions between a telecommunications switch and a bi-directional transceiver, in embodiments of the disclosed technology. Here, steps carried out by the telecommunication switch 132 are shown in the upper block, while steps carried out at the bi-directional transceiver 120 are shown in the lower block. As described above, the telecommunications switch 132 is a device, or plurality of devices, which work in concert or based on instructions from one another to carry out the methods claimed in embodiments of the disclosed technology, including but not limited to, communication with a phone network.

Steps 220, 225, and 230 remain as shown and described with respect to FIG. 2. Once a transcription is sent to the second network node in step 230, it is displayed on a device at such a second network node, in this case, the bi-directional transceiver 120. This transcription is exhibited at this device in step 370 and is in real-time, or substantially real-time, to the conversation taking place in, at least, step 220. Further, during the course of the conversation between the AI and the calling party, queries may be sent to be displayed on the bi-directional transceiver. For example, in the description of FIG. 2, it was explained how scheduling a meeting takes place in embodiments of the disclosed technology. Proposed times for the meeting, by way of example, can be made by the calling party or AI and determined to be selectable elements to exhibit in step 360. A selectable element might also include selection to drop the call, forward the call, or the like, as will be described further with reference to FIG. 4. Thus, in step 375, such selectable elements are exhibited, e.g., a button displayed on the screen of the bi-directional transceiver 120.

In addition to selecting an exhibited selectable element in step 310, a person operating the bi-directional transceiver 120 might also input text or speech in response to a query made by the AI to the second party (person receiving the transcript). A conversation, for example, might take place as follows:

Calling Party: "Please tell Adam his refrigerator is running."

AI: "I can do that for you. Hold on one moment."

Adam, viewing this conversation, might read this in the transcription on his device and then select a button such as, "Acknowledge receipt" in step 310, enter text into his device (e.g., by typing or selecting letters) in step 315, such as "I know" or inputting speech into a microphone of the device in step 318 by saying, "I know." In any of these cases, the inputted information on the bi-directional transceiver is then transmitted to the switch in step 320, such as via a wired or wireless network, such as a cellular phone data network or wired IP connection.

In another example, the calling party and AI are having a back and forth conversation such as follows:

Calling Party: "My internet is down."

AI: "I understand your internet connection is not working. Did you check if your router is plugged in?"

Calling Party: "The problem is DNS server is not responding."

AI: "Again, did you unplug your router and plug it back in?"

Calling Party: "Ugh. Don't you understand what I'm saying?"

At this point, the person reading the transcript over at the bi-directional transceiver may carry out step 315 or 318 and free-form enter text to be inserted into the conversation such as, "What is your DNS server IP address currently?" The AI will wait for a moment in the conversation to enter the text in step 350, when the input is parsed, and then modify the AI conversation in step 355 accordingly. The AI can transcribe the speech input 318 into text or use the text in step 315 and transcribe this into the AI voice stating, "What is your DNS server IP address currently?" In this manner, the calling party is still hearing only the AI but the input for the conversation is actually from a human interacting directly with the conversation.

In yet another embodiment, an AI need not be used at all. Building on the tech support example above, suppose the AI which does not understand "DNS server" is actually a human being. In such a case, in step 220 a human is conversing with the caller. In this case, the written transcript in step 225 is still carried out based on, at least in part, instructions read by the tech support person or speech recognition. The modification of the AI conversation in step 355 then becomes modification of the conversation, based on input provided by the second party. So the second party might then tell the tech support person (the called party) what to say, while monitoring the transcript. Many such transcripts of many simultaneous calls can be monitored in this way by, for example, a person with more experience in handling calls. Upon seeing that a call needs to be escalated to a higher level, such a selectable element can be selected in step 310, transmitted to the switch in 320, and the call is forwarded to the second party or another party better able to handle the call.

FIG. 4 depicts a bi-directional transceiver of a second party with real-time transcription and selectable elements used to interact with a calling party, in embodiments of the disclosed technology. Here, an example of a transcript 310 is shown above a variety of selectable buttons or elements numbered in the 400s. In this example, the AI and caller converse (again, AI can be replaced with a live human attendant, in embodiments of the disclosed technology), and the transcript is sent to the bi-directional transceiver 120, where it can be monitored in real-time. Any one or a plurality of the selectable elements shown in FIG. 4 can be shown at any given time.

Selectable element 415 instructs the AI to schedule a time to call back later and determine who will make the call and to what number. This is confirmed through a conversation where such information is exchanged and confirmed between the calling party (shown as "caller" in the figure) and the AI. Similarly, using selectable element 420, an in-person meeting can be scheduled. The operator of the device 120 may also desire to hear the audio in real-time by using selectable element 425 to do so. While doing so, the rest of the selectable elements can continue to function as before. Or, the person can take the call outright, using button 435, and the call is forwarded to the bi-directional transceiver 120. In some embodiments, the transcription continues, while in others the transcription ceases at this point.

The person can also select "forward" button 430 to have the call forwarded to a third party, as described with reference to FIG. 3. In such a case, the AI may first announce what is happening and to whom the call is being forwarded, either immediately or as part of a give and take (flow) of the conversation, waiting for an appropriate moment (pause) in the conversation. This is true of any interjection into the conversation by the second party including while using buttons 440, 445, 415, and 420. Buttons 440 and 445 are related, in that they allow the second party to interject into the call by either speaking (440) or entering text (445) which, as described with reference to FIG. 3, is parsed and inputted into the conversation with the calling party. After such an interjection by the second party, this party may decide to have the AI carry on the conversation based on the interjection and trajectory of the conversation at this point, or may choose to take over all further communication by communicating in such a manner, using selectable elements and/or speaking and/or entering text.

The blacklist selectable element 450 ensures that next time a particular calling party is recognized (such as by using voice recognition or caller identify information [e.g. CallerID or ANI]) the steps of sending a transcript to the second party/second node/bi-directional transceiver 120 are not carried out. Conversely, the whitelist selectable element 455 ensures that the next time a particular calling party is recognized in a subsequent call, the call is forwarded with two-way voice communication to the second node/bi-directional transceiver 120. In such a case, a transcription may or may not be made, depending on the embodiment. Thus, it should also be understood that hearing audio 425 and speaking 440 involves one way audio communication, whereas taking a call 435, or forwarding a call 430, involves two way audio communication. Speaking 440 can actually involve no direct audio communication, as a version of the spoken word is sent based on speech to text (speech recognition), followed by text to speech conversation, so that the speech is in the voice of the AI or other called party handing the audio of the call.

Figure 5:
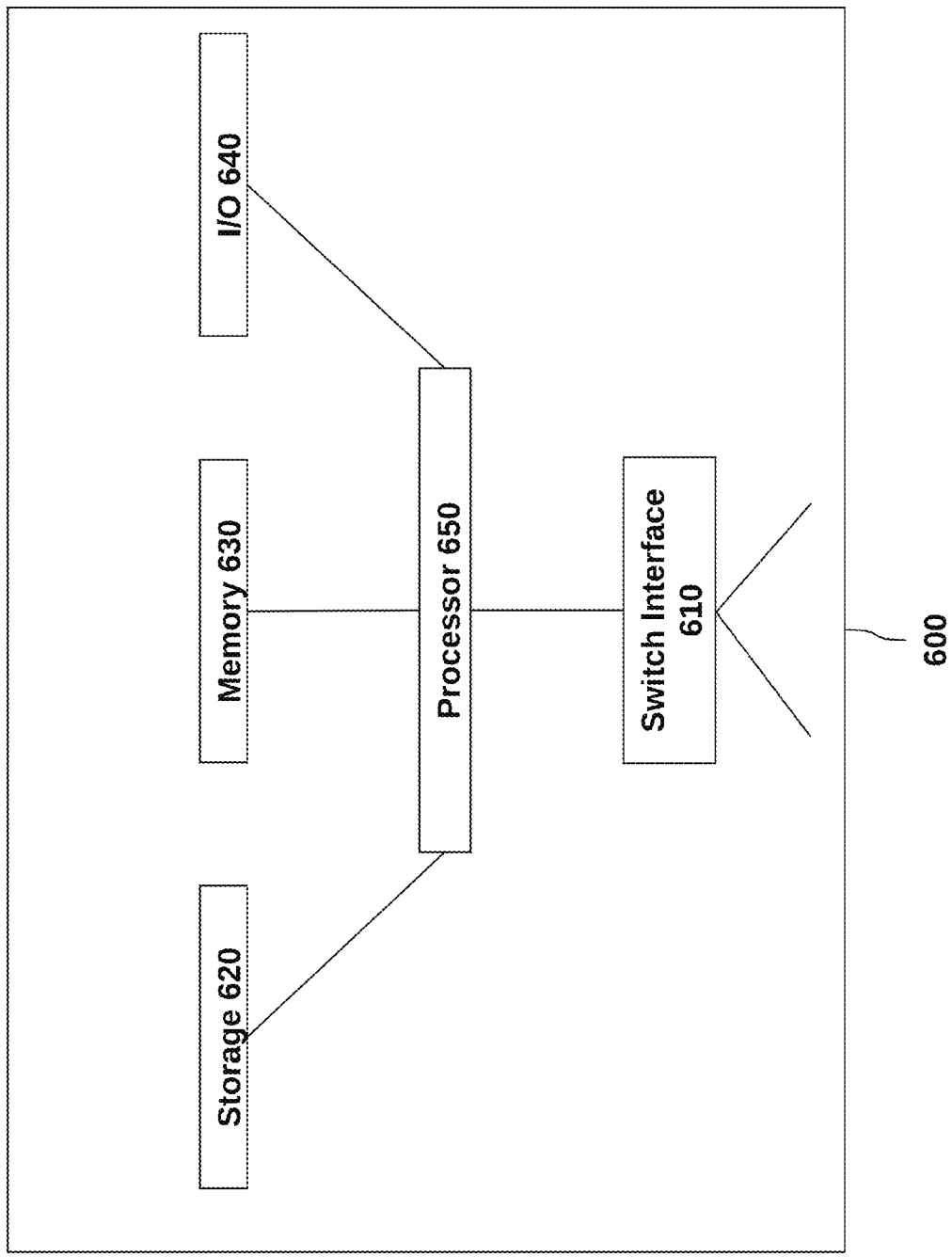
FIG. 5 shows a high-level block diagram of a device that may be used to carry out the disclosed technology.

FIG. 5 shows a high-level block diagram of a device that may be used to carry out the disclosed technology. Device 600 comprises a processor 650 that controls the overall operation of the computer, by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 6 is a high level representation of some of the components of such a device, for illustrative purposes. It should also be understood by one skilled in the art that the method and devices depicted in FIGS. 1 through 4 may be implemented on a device such as is shown in FIG. 5.

Further, it should be understood that all subject matter disclosed herein is directed at, and should be read only on, statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A method of communicating with a calling party using artificial intelligence when receiving a telephone call, comprising the steps of:
   receiving a phone call at a first network node from a calling party;
   based on speech recognition of audio received from said calling party, creating a transcription of said audio received from said calling party;
   transmitting audio output of at least one of:
      audio based on text to speech synthesis; and
      pre-recorded audio to said calling party of said telephone call;
   said audio output comprising responses based on said speech recognition; and
   while creating said transcription of at least some of said audio of said incoming telephone call, sending said transcription to a bidirectional transceiver at a second network node in real-time, wherein sending said transcription to said bidirectional transceiver causes a plurality of selectable elements to be exhibited on said bidirectional transceiver, wherein said selectable elements are based on preceding conversations between said calling party and said artificial intelligence;
   wherein the artificial intelligence communicates with the calling party automatically and independently unless overridden by instructions from the bidirectional transceiver.

2. The method of claim 1, wherein said audio output is based partially on artificial intelligence and partially on instructions received from said bidirectional transceiver receiving said transcription.

3. The method of claim 2, further comprising the step of receiving text input from said bidirectional transceiver; and
   playing a speech synthesized version of said text input as part of said audio output.

4. The method of claim 2, further comprising the step of receiving audio input from said bidirectional transceiver;
   converting said audio input to text; and
   playing a speech synthesized version of said audio input, based on said text, such that said speech synthesized version matches a voice of said speech synthesis in said audio output.

5. The method of claim 4, further comprising repeating said step of transmitting audio output of said speech synthesis comprising said responses based on said speech recognition, after said step of playing said speech synthesized version of said audio input.

6. The method of claim 1, wherein a selectable element of said selectable elements comprises at least one selector which, when selected, causes said call to be forwarded to another network node or called party.

7. The method of claim 1, wherein a selectable element of said selectable elements comprises at least one selector, which, when selected, causes future calls from said calling party received at said first network node, to be forwarded to said bidirectional transceiver, bypassing said step of said creating said transcription.

8. The method of claim 1, wherein a selectable element of said selectable elements comprises at least one selector, which, when selected causes future calls from said calling party to carry out said step of said receiving said phone call at said first network node and said using speech recognition while skipping or suppressing said step of sending said transcription to said bidirectional transceiver.

9. The method of claim 1, wherein said preceding conversation is detected as being related to scheduling a meeting between said calling party and another party, and said selectable elements comprise selections related to time.

10. The method of claim 1, wherein said transcription further comprises a transcription of said text which is part of said transmitting of said audio output.

11. A network switch, comprising:
    at least one phone network interface which receives phone calls from a calling party at a first network node;
    a physical storage medium which stores audio from said phone calls;
    a speech recognition engine which transcribes at least some of said audio from said phone calls;
    a transcription engine which transcribes at least some of said audio from said phone calls;
    a packet-switched data network connection which transmits audio output of at least one of:
       audio based on text to speech synthesis; and
       pre-recorded audio to said calling party of said telephone call;
       wherein said audio output comprises responses based on output of transcriptions from said speech recognition engine or said transcription engine; and
    while transcribing said at least some of said audio of said telephone call, sending said transcription to a bidirectional transceiver at a second network node in real-time, wherein sending said transcription to said bidirectional transceiver causes a plurality of selectable elements to be exhibited on said bidirectional transceiver, wherein said selectable elements are based on preceding conversations between said calling party and said artificial intelligence,
    wherein the artificial intelligence communicates with the calling party automatically and independently unless overridden by instructions from the bidirectional transceiver.

12. The network switch of claim 11, wherein said audio output is based partially on artificial intelligence and partially on instructions received from said bidirectional transceiver receiving said transcription.

13. The network switch of claim 12, wherein data are transmitted via said packet-switched data network to said bidirectional transceiver causing the plurality of selectable elements to be exhibited on said bidirectional transceiver, wherein said selectable elements are based on preceding conversation between said calling party and said artificial intelligence.

14. The network switch of claim 12, wherein text input from said bidirectional transceiver is received via said packet-switched data network connection; and
    playing a speech synthesized version of said text input as part of said audio output.

15. The network switch of claim 12, wherein audio input from said bidirectional transceiver is received via said packet-switched data network connection;
    said audio input is converted to text; and a speech synthesized version of said audio input, based on said text, is exhibited over said phone network, such that said speech synthesized version matches a voice of said speech synthesis in said audio output.

16. The network switch of claim 13, wherein a selectable element of said selectable elements comprises at least one selector which, when selected, causes said call to be forwarded to another network node or called party.

17. The network switch of claim 16, wherein a selectable element of said selectable elements comprises at least one selector which, when selected, causes future calls from said calling party received at said first network node to be forwarded to said bidirectional transceiver, bypassing said step of said creating said transcription.

18. The network switch of claim 13, wherein a selectable element of said selectable elements comprises at least one selector, which, when selected, causes future calls from said calling party to carry out said step of said receiving said phone call at said first network node and said using speech recognition while skipping or suppressing said step of sending said transcription to said bidirectional transceiver.

19. The network switch of claim 13, wherein said preceding conversation is detected as being related to scheduling a meeting between said calling party and another party, and said selectable elements comprise selections related to time.

* * * * *